N. LOSEY.
ARTIFICIAL LIGHT DIFFUSING APPARATUS.
APPLICATION FILED DEC. 29, 1911.
1,082,753.
Patented Dec. 30, 1913.
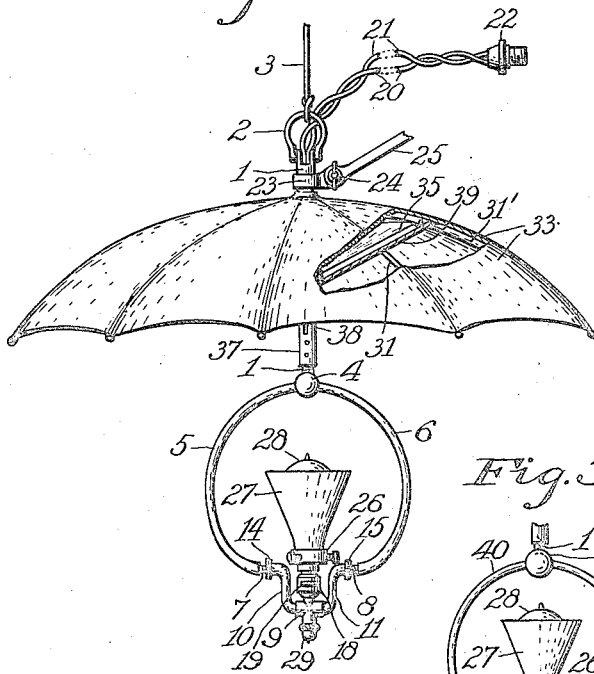
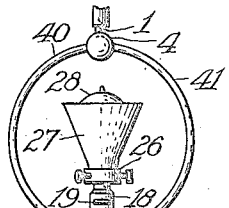
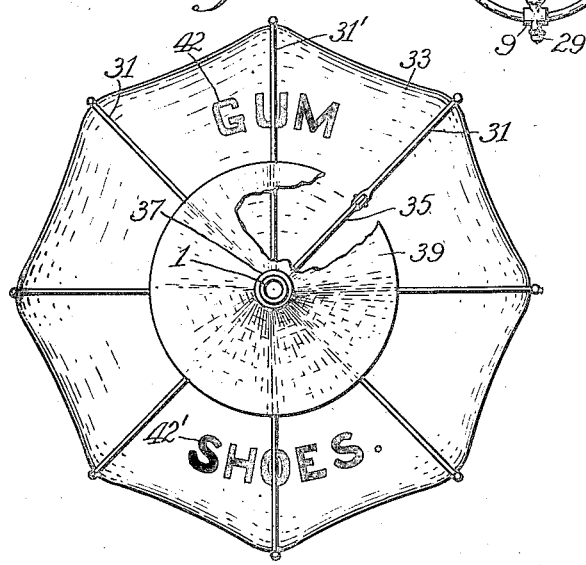
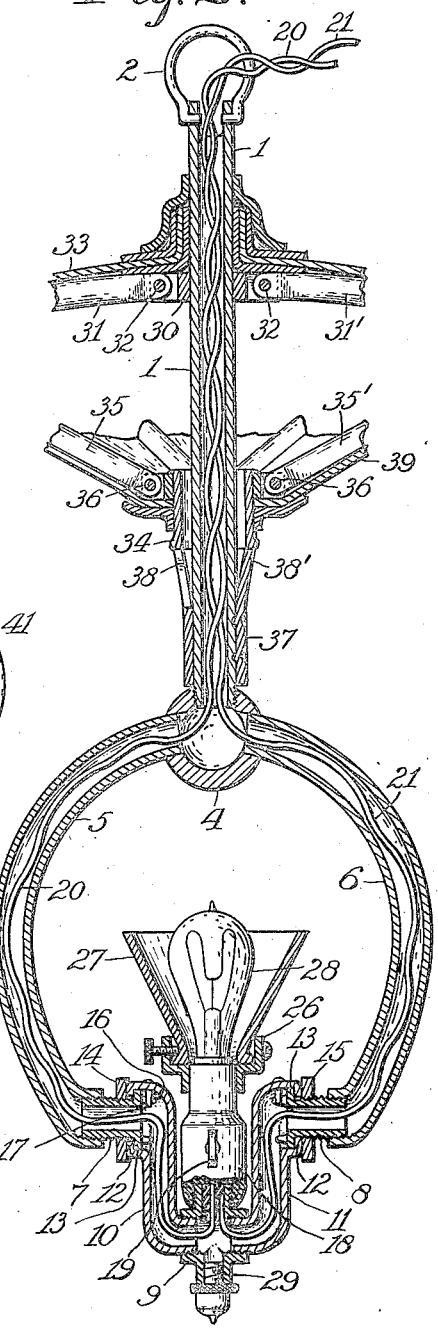
WITNESSES:
J. H. Gardner
M. M. Wilkerson
INVENTOR:
North Losey,
BY
E. T. Silvius,
ATTORNEY.

UNITED STATES PATENT OFFICE.

NORTH LOSEY, OF INDIANAPOLIS, INDIANA.

ARTIFICIAL-LIGHT-DIFFUSING APPARATUS.

1,082,753. Specification of Letters Patent. Patented Dec. 30, 1913.

Application filed December 29, 1911. Serial No. 668,473.

*To all whom it may concern:*

Be it known that I, NORTH LOSEY, a citizen of the United States, residing at Indianapolis, in the county of Marion and State of Indiana, have invented new and useful Artificial-Light-Diffusing Apparatus, of which the following is a specification, reference being had to the accompanying drawings and to the letters and figures of reference marked thereon.

This invention relates to lamps and appurtenances thereof that are adapted to produce either direct or indirect artificial light by which to work or read, and that may be adapted for photographic uses or for illumination generally, and especially in dwelling apartments, the invention having reference particularly to an improved lamp, or light producing apparatus, that may be used without injury to the eyes, and also be adapted to give the benefit of the direct rays of light when desired.

In Patent No. 999,813, granted to me August 8, 1911, is shown a light-diffusing apparatus comprising a focusing or concentrating reflector to reflect the light upward to a diffusing reflector that is adapted to reflect the light downward, the direct rays of light always being excluded from the objects or persons below by means of the stationary focusing reflector. In said apparatus the diameter of the diffusing reflector cannot be as great as may in some cases be desired, owing to the particular construction of the frame that supports it. In Patent No. 923,542, granted to me June 1, 1909, a diffusing reflector is shown that is extremely large relatively to the source of light and the focusing reflector, being especially well adapted for photographic purposes, the supporting frame of the apparatus, however, being unsuitable for domestic light.

A particular object of the present invention is to so improve the construction of light-diffusing apparatus as to provide the advantages of the relatively large diffusing reflector in a lamp that will be especially suitable either for domestic purposes, or for advertising purposes, as in stores or store windows, or elsewhere, and which will be symmetrical and ornamental as well as useful.

A further object of the present invention is to provide improved light-diffusing apparatus that will be adapted especially for use when it is convenient and desirable that the source of light be arranged above the person or persons using it, so that the direct rays of light may be excluded from the eyes; or, if desired, that the user may have the benefit of the direct rays which give a brighter light and are sometimes more desirable and economical in use.

With the above mentioned and other objects in view, the invention consists in an improved light-diffusing apparatus comprising a novel frame, supporting means for maintaining the frame with its axis approximately vertical, and means for adjustably tilting the axis of the frame to a desired angle, a focusing or concentrating reflector having a lamp therein and provided with novel means for adjusting the reflector to invert it and the lamp, and a concavo-convex reflector and diffuser or diffusion reflector mounted on the frame; and the invention consists further and specifically in the novel parts and combinations and arrangements of parts, as hereinafter particularly described and further defined in the appended claims.

Referring to the drawings, Figure 1 is a front elevation of the improved apparatus shown as a hanging-lamp and constructed substantially in accordance with the invention, part of the diffusing reflector being broken away for clearness of illustration; Fig. 2, a vertical central sectional view, with the major parts of the diffusing reflector broken away; Fig. 3, a fragmentary elevation of a modified form; Fig. 4, an inverted plan of the diffusing reflector, in which a portion is broken away, an advertisement being on the reflector.

Similar reference characters in the different figures of the drawing indicate like elements or features of construction referred to herein.

The connecting and supporting means for the two normally opposed reflectors and the lamp or light producing element comprise a hollow frame stem 1 to one end of which is secured a ring 2, and a cord or link 3 is connected to the ring and may be supported by the ceiling of a room or by other suitable support. The opposite or lower end of the stem 1 is secured to a hollow ball 4 which serves as a pipe-T. The frame includes two hollow branches 5 and 6 which are attached to the opposite sides of the ball, the said branches constituting curved arms which form a hanging support connecting the diffusing reflector with the lamp and the focusing or concentrating reflector, and serving also to incase the electric wiring, as will further appear. The lower ends of the two arms 5 and 6 are provided with flanged nipples 7 and 8 respectively comprising parts of swivel-joints. An adjustable yoke is provided which includes a pipe-cross 9 having on the two opposite side branches thereof two hollow arms 10 and 11 respectively, the ends of the arms being bent and forming outward turned elbows that have internal flanges 12 engaging external flanges 13 on the nipples 7 and 8, the nipples having lock nuts 14 and 15 thereon respectively, to prevent accidental turning of the yoke at the swivel-joints which are formed by the said flanges, 12 and 13. A suitable projection 16 on the nipple and a suitable projection 17 in the yoke arm form stops, so that the attendant can quickly adjust the lamp and focusing reflector in its proper upright position and secure it by the lock-nuts 14 and 15, but in some cases the lock-nuts may not be used, as the stops 16 and 17 permit the lamp when being turned to an upright position to just pass beyond the point of the center of gravity when arrested by the stops. One of the vertical branches of the pipe-cross 9 supports a suitable electric switch-box 18 or similar device provided with a lamp-socket and also a switch-key 19 of usual construction. Electric circuit wires 20 and 21 extend as usual from the switch-box and also through the yoke and swivel-joints up through the arms 5 and 6 and hollow stem 1, thence to a plug 22 which is adapted to be connected to the feed-wires in a well known manner. It will be understood that instead of the wires 20 and 21 branching out so as to pass through both of the arms 5 and 6 as shown in the drawings for clearness, the two wires may be placed in one of the arms for convenience, and in some cases the cord 3 which, as shown in the drawing supports the light, may be omitted and the wires 20 and 21 may support the light when the plug 22 is secured above the lamps and the frame construction is not too large or heavy to be supported by the circuit wires. A band clamp 23 is shown clamped to the stem 1 by a clamp-bolt and nut 24 which also adjustably clamps an arm 25 to the stem 1, which arm may be suitably adapted to be supported by any suitable means, as a wall or a post, not shown in the drawing. The switch-box supports a shade holder 26 in which is secured a focusing reflector 27 that extends about an electric lamp 28 and upward approximately to the top of the lamp, and so as to reflect the light of the lamp directly upward, the lamp being secured in the socket of the switch-box as usual. In the remaining one of the branches of the pipe-cross 9 is screwed an ornamental plug 29 which closes the branch.

A collar 30 is suitably secured to the upper end portion of the stem 1 and has a suitable number of frame ribs 31 and 31' connected thereto by pivots 32 so that they may swing downwardly against the stem 1. A web 33 is spread upon the ribs 31 and 31' and suitably attached thereto so as to form the necessary surface of the combined reflector and diffuser, the reflecting side of the web being concave and the outer side convex, and it is composed of any suitable fabric material, and if desired, may be coated on its concave side with paint or other suitable substance.

A runner 34 is loosely mounted on the stem 1 and has a suitable number of braces 35 and 35' connected thereto by pivots 36, the several braces extending to the several ribs 31 and 31' to which they are pivoted.

The stem 1 is provided with a collar 37 suitably secured thereto, the collar having spring fingers 38, 38', extending upward from the collar and outwardly from the stem 1. The spring fingers constitute latches for holding the runner 34 when moved upward toward the collar 30 so as to spread the web. When the runner is required to be released to fold the web the fingers 38, 38', must be compressed or closed in to the stem and the runner 34 will then slip over the fingers and collar 37 which is clearly shown as being smaller in diameter than the inside diameter of the runner. When the web is required to be spread again, it is necessary to push the runner up over the collar until latched by the fingers. If the runner is required to be moved off of the lower end of the stem 1, the ball must first be disconnected from the stem and the circuit wires should be drawn down in the stem.

Secured to the braces 35 and 35' and the web 33 in any suitable manner is a webbing 39, on the under side thereof, which by being conical in shape gives a greater area of reflecting and diffusing surface in the central portion of the diffusing reflector where the rays of light are more powerful and effective. The said webbing 39 being on the under side of the braces also gives the reflector a better appearance by hiding the braces and the ribs from view. By being conical in shape the webbing 39 also reflects and diffuses the rays of light out at an angle from the stem 1 beyond the lamp and toward the place where the work or reading matter is most generally located, while the web 33 reflects the light inward so as to light the space under the lamp.

In some cases where a diffused light only is desired of the above mentioned character it is never required that the lamp be inverted, and therefore the adjustable yoke and swiveled-joints may be omitted, and curved arms 40 and 41 may be secured in the ball or pipe-T 4 and the pipe cross 9 at the bottom, as clearly shown in Fig. 3 of the drawing.

When the improved light is to be used in shops or public places the diffusing reflector or webbing 33 may have words 42 and 42′ or characters printed or painted on the under side thereof, for advertising purposes.

In practical use, as will be apparent, the apparatus may be folded for shipment, or unfolded for use; and the diffusing reflector may be readily adjusted to any angle desired if mounted on the bracket or arm 25. The focusing or concentrating reflector and the lamp may be adjusted so that they will reflect the light upward or downward as may be desired. When focused upward about a vertical axis the rays of light come in contact against the substantially parallel diffusing reflector which will reflect and diffuse the light downward and outward, so that the subject need not be exposed to the direct rays of light unless desired.

Having thus described the invention, what is claimed as new is—

1. Light-diffusing apparatus including a frame, a yoke swiveled and adjustably connected to one portion of the frame, a diffusing reflector mounted remotely from the yoke on the opposite portion of the frame, an electric switch-box mounted on the yoke to be tilted thereby, a concentrating reflector mounted on the switch-box, and a lamp in the concentrating reflector connected to the switch-box.

2. Light-diffusing apparatus including a stem, a light reflector and diffuser mounted on the stem, braces connected substantially with the stem and the reflector and diffuser, an arm connected with the stem, a concentrating reflector and a lamp supported by the arm, and a conical light reflector and diffuser mounted on the braces opposite the lamp.

3. Light-diffusing apparatus including a hollow stem and a curved hollow arm on one end thereof, a folding light reflector and diffuser mounted remotely from the arm on the opposite end portion of the stem, a concentrating reflector supported by the arm, an electric-lamp in the concentrating reflector, and a circuit wire extending through the stem and the arm to the lamp.

4. Light-diffusing apparatus including a concave light reflector and diffuser, a concentrating reflector, a lamp in the concentrating reflector, and means for supporting the concentrating reflector and the reflector and diffuser each relatively to the other and enabling the concentrating reflector to be turned either to face toward or to face away from the reflector and diffuser.

5. Light-diffusing apparatus including a diffusing reflector, ribs secured to the reflector, a concentrating reflector, a lamp in the concentrating reflector, a frame comprising a stem extending through and connected to the diffusing reflector and the ribs and also an arm connected to one end of the stem and supporting the concentrating reflector and the lamp, a holder supported by the stem in proximity to the arm, and braces connected to the holder and the ribs.

6. Light-diffusing apparatus including a frame comprising a stem and two curved arms on one end thereof, a light reflector and diffuser mounted on the opposite end portion of the stem remote from the arms, ribs secured to the reflector and diffuser, a yoke comprising two arms adjustably connected to the arms of the frame, a concentrating reflector supported by the yoke, a holder supported by the stem in proximity to the arms, and braces connected to the holder and the ribs.

7. Light-diffusing apparatus including a frame, a concentrating reflector mounted on one end portion of the frame, a lamp in the concentrating reflector, a relatively large concave light reflector and diffuser mounted on the frame for reflecting light toward and beyond the lamp, and a convex reflector and diffuser mounted on the frame between the lamp and the concave reflector and diffuser for reflecting light away from and beyond the lamp.

8. Light-diffusing apparatus including a stem, a ring connected to one end of the stem, a folding deflector and diffuser mounted on the stem adjacent the ring, a runner movably mounted on the stem, braces connected to the runner for spreading the reflector and diffuser, an arm detachably connected with the opposite end of the stem to permit the runner to be moved from the stem, and a condensing reflector and also a lamp supported by the arm.

9. Light-diffusing apparatus including a frame comprising a stem having two curved arms on one end thereof, a light reflector and diffuser mounted on the opposite end portion of the stem, a yoke comprising two arms swiveled to the arms of the frame, an electric switch-box connected to the yoke, a concentrating reflector connected to the switch-box, an electric-lamp in the concentrating reflector connected to the switch-box, and circuit wires connected with the switch-box and extending through the yoke.

10. Light-diffusing apparatus including a stem, two curved arms detachably connected to one end of the stem, a yoke having arms swiveled to the curved arms and provided with stops, lock-nuts on the supporting arms engaging the arms of the yoke, a switch-box connected to the yoke, a concentrating reflector and a lamp connected to the switch-box, circuit wires connected with the switch-box and extending through the yoke, and a light reflector and diffuser mounted on the opposite end portion of the stem.

11. Light-diffusing apparatus including a hollow stem having two arms connected with one end portion thereof, a plurality of ribs pivotally connected with the opposite end portion of the stem, a flexible light reflector and diffuser connected to the ribs, a collar secured to the stem adjacent the arms and having spring fingers thereon, a runner movably mounted on the stem and normally in contact with the fingers, braces connected to the runners and also to the ribs, a concentrating reflector and also an electric-lamp supported by the arms, and a circuit wire extending through the hollow stem for supplying current to the lamp.

In testimony whereof, I affix my signature in presence of two witnesses.

NORTH LOSEY.

Witnesses:
  E. T. SILVIUS,
  J. H. GARDINER.